UNITED STATES PATENT OFFICE.

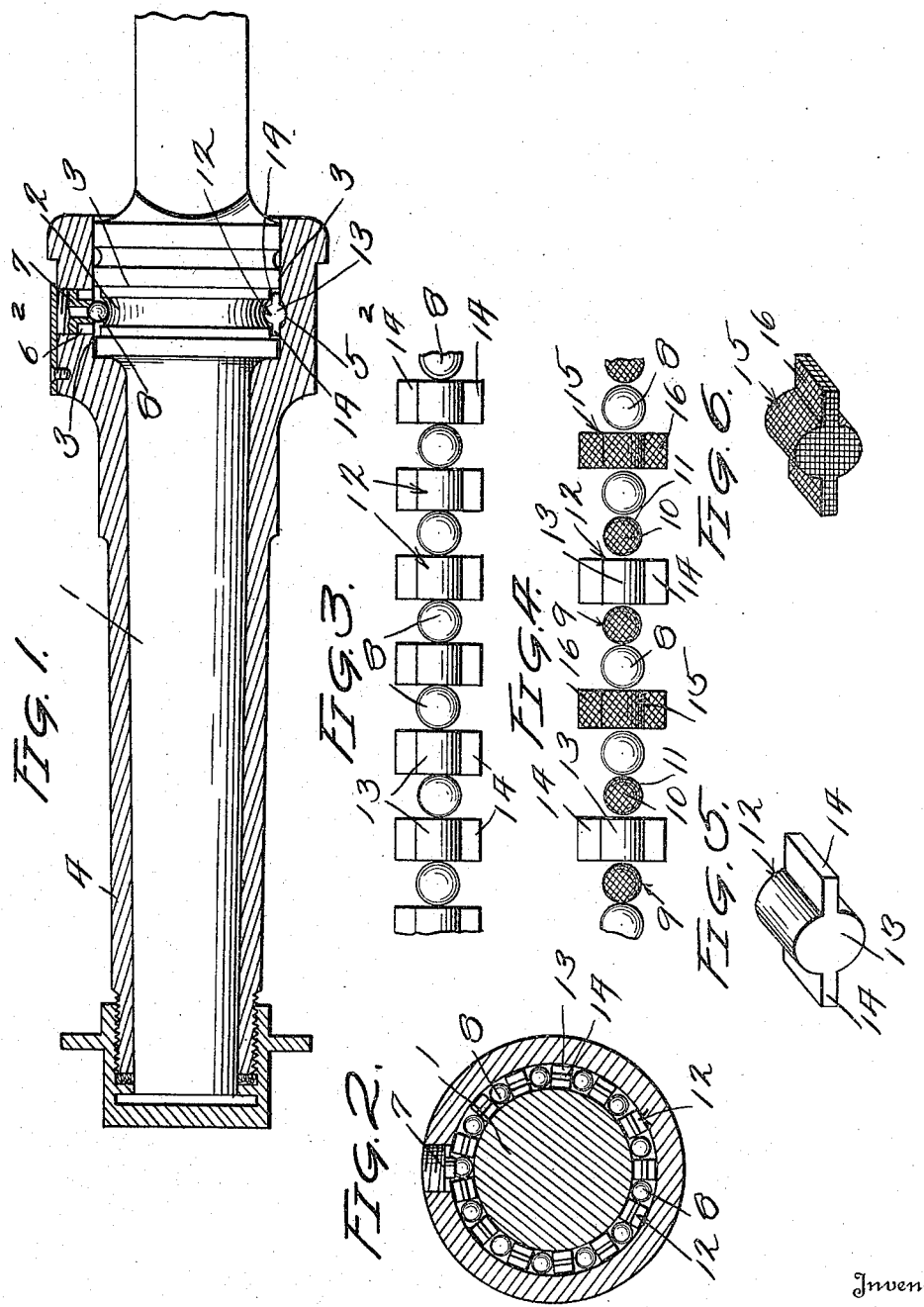

SULLIVAN H. ATKINS, OF MELROSE, MASSACHUSETTS.

BALL-BEARING.

1,209,537.

Specification of Letters Patent.    Patented Dec. 19, 1916.

Application filed April 27, 1916.   Serial No. 93,979.

*To all whom it may concern:*

Be it known that I, SULLIVAN H. ATKINS, a citizen of the United States, residing at Melrose, in the county of Middlesex, State of Massachusetts, have invented certain new and useful Improvements in Ball-Bearings; and I do hereby declare the following to be a full, clear, and exact description of the invention, such as will enable others skilled in the art to which it appertains to make and use the same.

The present invention is directed to improvements in hub attaching devices, and has for its object to so construct a device of this character that the hub will be retained on the axle spindle without the aid of nuts or caps.

A further object of the invention is to provide means for interlocking the spindle sleeve and axle spindle against relative longitudinal movement, but permitting the spindle sleeve to freely rotate on the axle spindle.

A still further object of the invention is to provide novel means for lubricating the interlocking device.

Still another object of the invention is the employment of a plurality of balls and slugs arranged to interlock the spindle sleeve and axle spindle.

With these and other objects in view, this invention resides in the novel features of construction, formation, combination and arrangement of parts to be hereinafter more fully described, claimed and illustrated in the accompanying drawing, in which:—

Figure 1 is a longitudinal sectional view through the device. Fig. 2 is a sectional view on line 2—2 of Fig. 1. Fig. 3 is a view illustrating in plan the relative relation of the balls and slugs. Fig. 4 is a similar view, showing the use of a modified form of lubricating device. Fig. 5 is a detail perspective view of one of the slugs. Fig. 6 is a similar view of one form of the lubricating device.

Referring to the drawing 1 indicates the axle spindle which is provided adjacent its inner end with an annular groove 2, the sides of which terminate in annular shoulders 3, the purpose of which will appear later. The spindle sleeve 4 is provided adjacent its inner end with an annular groove 5, and communicating with said groove is a threaded opening 6, through which the locking devices are passed when the grooves 2 and 5 are in registry, said opening being normally closed by a screw plug 7. When the grooves 2 and 5 are in registry, the balls 8 are dropped through the opening 6 so as to occupy the grooves and interlock the sleeve 4 and spindle 1. After each ball is dropped through the opening, a lubricating device 9 is dropped therethrough, said lubricating device consisting of a ball of felt 10 confined in a wire mesh cage 11, said ball being saturated with a suitable lubricant. After the ball 10 has been dropped through the opening 6, a metal slug 12 is dropped therethrough, said slug comprising a cylindrical central portion 13 and oppositely disposed webs 14 which are adapted to engage the shoulders 3, said slugs serving in conjunction with the balls and to prevent accidental removal of the hub from the wheel.

As shown in Figs. 1 to 3, the lubricating devices are not shown, as in this form of the invention only balls and slugs are used.

In Fig. 4, the lubricating devices are shown and are so arranged that the metal balls and slugs will not touch each other. In this figure, lubricating devices 15 are shown, which are formed from felt and are shaped similar to the slugs 12 but somewhat smaller, said devices being covered with a wire cage 16. The felt balls 10 are also smaller than the balls 8.

When the balls 10 and devices 15 are used, as shown in Fig. 4, it is obvious that the metal balls and slugs will be constantly supplied with a lubricant.

Should it be desired to clean the spindle and sleeve, it is only necessary to remove the plug 7, after which oil of any character can be poured in the opening 6 and as it flows therethrough, it will carry with it any grit or dirt which may have entered the hub.

What is claimed is:—

1. In combination with an axle spindle having an annular groove formed at its inner end, a spindle sleeve engaged in the spindle, and having a groove therein for registering with the first named groove, a plurality of balls engaged in the registered grooves, and a plurality of slugs for spacing the balls, said slugs having oppositely directed webs carried thereby and extending beyond the sides of the grooves.

2. In combination with an axle spindle and its sleeve, each having confronting grooves adjacent their inner ends, a plurality of balls and slugs mounted in the grooves to prevent relative endwise movement of the spindle and sleeve, lubricating devices arranged between the balls and slugs, said devices being formed from felt and having wire cages therearound, said devices being adapted to be saturated with a lubricant and are provided with webs which extend beyond the sides of the grooves, as and for the purpose set forth.

In testimony whereof, I affix my signature, in the presence of two witnesses.

SULLIVAN H. ATKINS.

Witnesses:
ARTHUR HILL,
JAMES E. RICKER.